United States Patent [19]

Hofstetter

[11] 4,296,728
[45] Oct. 27, 1981

[54] ENERGY SAVING POTS, PANS AND ADAPTER

[76] Inventor: Robert A. Hofstetter, 2436 Birch Log Way, Hacienda Heights, Calif. 91745

[21] Appl. No.: 899,984

[22] Filed: Oct. 30, 1978

[51] Int. Cl.³ .................. A47J 27/00; B65D 8/06
[52] U.S. Cl. .................... 126/376; 126/215; 126/390; 220/69; 220/400; 220/408; 220/469
[58] Field of Search ............ 220/8, 408, 446, 448, 220/469, 69, 400; 126/275 R, 275 E, 387, 215, 218, 214 D, 373, 390, 376; 219/432, 433, 415; 248/149, 157

[56] References Cited

U.S. PATENT DOCUMENTS

| 685,736 | 11/1901 | Atwell | 220/8 |
| 2,176,400 | 10/1939 | Hamblet | 126/390 X |
| 2,522,085 | 9/1950 | Beckemeyer et al. | 219/433 |
| 2,748,952 | 6/1956 | Fleit et al. | 220/69 X |
| 3,316,388 | 4/1967 | Wickenberg et al. | 220/69 X |

FOREIGN PATENT DOCUMENTS

| 655464 | 4/1929 | France | 220/8 |
| 77510 | 9/1918 | Switzerland | 126/215 |
| 97237 | 12/1922 | Switzerland | 126/390 |
| 399462 | 1/1932 | United Kingdom | 126/390 |

Primary Examiner—Allan N. Shoap

[57] ABSTRACT

A cooking ware vessel, such as a pot or pan, and which includes a bell-shaped heat shield spaced around its side, in order to prevent cooking heat from escaping sidewardly, away from the vessel side wall; the shield being made either integrally with the vessel, or else being removably fitted therearound.

1 Claim, 9 Drawing Figures

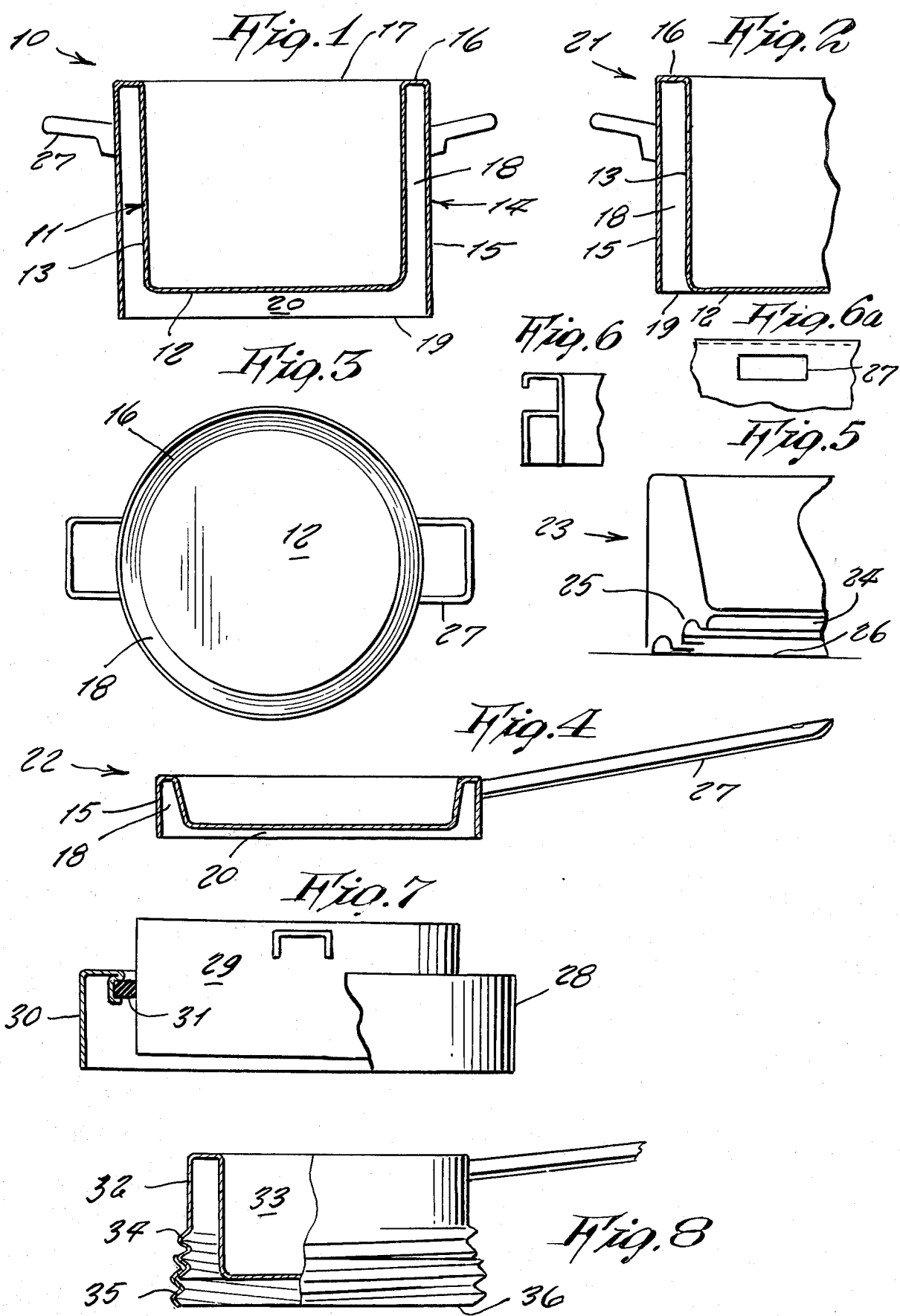

ENERGY SAVING POTS, PANS AND ADAPTER

This invention relates generally to cooking vessels, such as pot and pans, such as are used on top of a stove burner for cooking foods.

It is well known that, at this time, there is a considerable awareness of the conservation of energy, so that, in all fields, steps are being taken to accomplish the same work with less energy than heretofore. One such place, where energy conservation has still not been improved, is in the ordinary kitchen, where cooking vessels are heated over a stove burner. A careful study of such heating shows that, after heat is applied directly to the vessel bottom, it then spreads sidewardly, so as to rise around the outer side of the vessel. However, the sideward spread of the heat is not confined, so that it spreads far from the vessel's side wall, where it accomplishes no useful work. The loss of such heat creates a situation which is, accordingly, in want of an improvement.

Therefore, it is a principal object of the present invention to provide a cooking vessel which utilizes more all heat that rises therearound, so that the same cooking can be accomplished by using a smaller flame of a stove burner, and conserve on fuel.

Another object is to provide a cooking vessel which may comprise either a pot or pan, and which includes a heat shield therearound, so as to retain rising heat in concentrated contact with the vessel side.

Other objects are to provide an energy saving pot, pan and adapter, which are simple in design, inexpensive to manufacture, rugged in construction, easy to use and efficient in operation.

These, and other objects, will be readily evident, upon a study of the following specification, and the accompanying drawing, wherein:

FIG. 1 is a side cross-sectional view of a pot incorporating the present invention, and shown designed for use on an electric range;

FIG. 2 is a fragmentary similar view of a pot, designed to use on a gas range;

FIG. 3 is a bottom view of the pot;

FIG. 4 is a side cross-sectional view of a pan incorporating the invention;

FIG. 5 is an enlarged detail of a modified design of the pan;

FIG. 6 is a view of a recessed handle in a full double-wall pot;

FIG. 6a shows the handle in elevation;

FIG. 7 is a side view, partly in cross-section, of an adapter for fitting around single walled pots or pans, and FIG. 8 is a side view, partly in cross-section, of yet another design, in which an adapter around a double-wall pot or pan can be screwed either higher or lower, so as to fit either on a gas or electric range.

Referring now to the drawing in greater detail, and more particularly, to FIGS. 1 and 3 thereof, at this time, there is shown an energy saving pot 10, according to the present invention, wherein there is a pot member 11, having a circular bottom wall 12, and high cylindrical side wall 13. In the present invention, a heat shield 14 is made integral with the pot, by comprising a cylindrical side wall 15, spaced around the outer side of the pot and the upper edge of the shield including a circular inward flange 16, that is formed integrally with the pot upper edge 17. Thus, a space 18 is formed all around the outer side of the pot, the space being closed at the top, and open at the bottom, so that heat can enter therein from a stove burner.

The energy pot, shown in FIG. 1, has a lower edge 19 of the shield extend downward a greater distance than the pot bottom, so that there is a space 20, between the pot bottom and a stove burner. This design of energy pot is for use on an electric range, so that it rests with the edge 19 on the stove top.

The energy pot 21, shown in FIG. 2, is designed for use on a gas range, by having the pot bottom 12 rest on the burner, so that the shield edge 19 extends downward not lower than the pot bottom wall.

In FIG. 4, the same design features of energy pot 10 are shown applied to an energy frying pan 22, wherein a frying pan member substitutes for the pot member 11.

In FIG. 5, another design of energy saving pan 23 is shown, having a heating unit 24 built under its bottom wall. A trim ring 25 supports the heating unit. A stove reflector pan 26 encloses its underside.

FIGS. 6 and 6a show construction details of a handle 27, in a full double walled pot.

FIG. 7 illustrates a shield adapter 28, which can be slid around a conventional, single walled pot 29. The adapter comprises a shield 30, and a resilient, heat resistant gasket 31 for holding firmly around the pot.

In FIG. 8, a shield 32, built around pot 33, is screw threaded, as shown at 34, so that an extension 35, screwed thereon, allows converting the pot for electric or gas range use, by raising or lowering the edge 36.

While various changes may be made in the detail construction, it is understood that such changes will be within the spirit and scope of the present invention, as is defined by the appended claims.

What I now claim is:

1. An energy saving cooking vessel, comprising a container member including a bottom wall and a first side wall extending upwardly from said bottom wall, a continuous, peripheral, transverse wall extending radially outwardly from the top periphery of said first side wall, a second wall extending downwardly from the outer periphery of said transverse wall, said second side wall surrounding and spaced from said first side wall from said outer periphery to substantially the same plane as said bottom wall, the space defined between the first and second side walls being axially opened at the bottom thereof while being otherwise enclosed, said second side wall and said transverse wall together defining heat shield means to retain rising heat from a stove burner entering said space to thereby conserve energy needed during cooking, a heat shield extension adjustably attached by securement means to said cooking vessel at the lower portion of said second side wall, said securement means including said second side wall and said heat shield extension each being screw-threaded for adjustably telescoping one within the other by relative rotary movement of the vessel and extension, said heat shield extension allowing said cooking vessel to be elevated at different heights and aiding in retaining rising heat within said space at the elevated heights.

* * * * *